Jan. 24, 1956 L. W. BENDER 2,732,075
OIL FILTER
Filed Dec. 7, 1953 2 Sheets-Sheet 1

Leon W. Bender
INVENTOR.

BY Clarence A. O'Brien
and Harvey B. Jacobson
Attorneys

Jan. 24, 1956     L. W. BENDER     2,732,075
OIL FILTER

Filed Dec. 7, 1953     2 Sheets-Sheet 2

Leon W. Bender
INVENTOR.

United States Patent Office 2,732,075
Patented Jan. 24, 1956

2,732,075

OIL FILTER

Leon W. Bender, Baraboo, Wis.

Application December 7, 1953, Serial No. 396,373

2 Claims. (Cl. 210—140)

The present invention relates to new and useful improvements in oil filters of the replaceable cartridge type for use with internal combustion engines.

An important object of the invention is to provide an oil filter which may be serviced without the use of tools and the cartridge removed and replaced with a minimum of time and effort.

Another object is to construct a sectional casing for the replaceable cartridge and providing the cartridge with an external flange which is sealed between the meeting edges of the casing sections to support the cartridge centrally in the casing to form a sludge chamber in the upper section of the casing and a sump chamber in the lower section of the casing under the lower portion of the cartridge.

A further object is to provide an oil filter wherein the oil is precipitated on top of a conical filter cartridge to cascade over all sides thereof and flow by gravity through the cartridge to the outlet at the base of the casing.

A still further object is to construct a filter casing wherein the leak potentials are reduced to a minimum.

An additional object is to provide a device of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
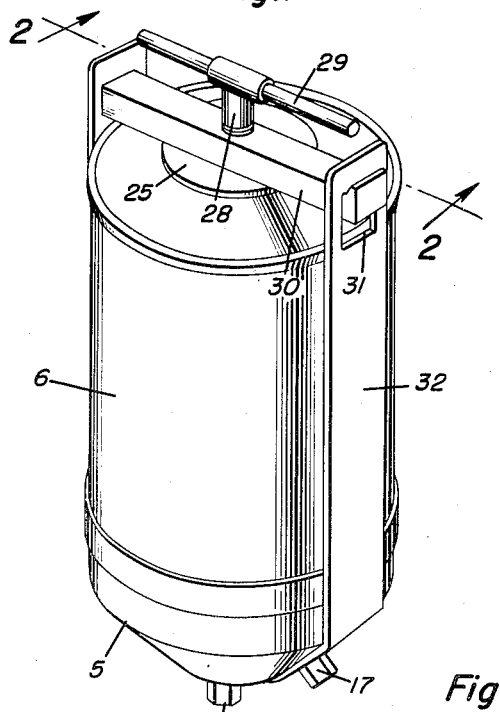
Figure 1 is a perspective view.

Referring now to the drawings in detail, wherein for the purpose of illustration I have disclosed a preferred embodiment of my invention, the numeral 5 designates a lower casing section and 6 is an upper casing section. Lower section 5 is sleeved over the lower end of upper section 6 which is supported on an internal shoulder 7 in the lower section.

A replaceable filter cartridge 8 of cylindrical shape is formed with a conical upper end or tip 9 and is also formed adjacent its lower end with an external annular flange 10 which rests on shoulder 7 under the lower end of upper section 6 of the casing to support the cartridge centrally in the casing and above the bottom of the lower section 5. A gasket 11 seals the flange at the shoulder 7 and also seals the meeting ends of the upper and lower sections of the casing. Thumb screws 12 are threaded upwardly through the flange into ears 13 at the lower edge of upper section 6 to secure the cartridge thereto.

The upper portion of the cartridge above the flange and including the conical tip 9 is perforated, as shown at 14, and the bottom of the cartridge is also formed with perforations 15. A loose filtering element 16 of a conventional type is placed in the cartridge.

An oil inlet pipe 17 enters the lower section of the casing 5 and is sleeved with a tapered fit in the lower end of a nipple 18 which extends vertically through the flange 10 and with the upper end of the nipple connected to a pipe 19 which is supported vertically between the cartridge and the walls of the upper section 7 by clips 20. The upper end of pipe 19 extends inwardly toward the central top portion of the casing to overlie the conical tip 9 to precipitate oil onto the top of the cartridge for cascading over the sides thereof.

The upper section 6 provides a chamber 21 in which the oil is collected and the portion of the cartridge immediately above flange 10 is imperforate to form a sludge chamber 22 collecting sediment therein. The lower section 5 forms a sump 23 under the cartridge into which the filtered oil flows by gravity and a nipple 24 for a return pipe (not shown) is attached to the bottom of the lower section of the casing.

A disk 25 is formed with a central recess 26 which is closely fitted in an opening 27 in the top of the casing and a clamping screw 28 having a handle 29 is threaded downwardly through a clamping bar 30 to engage the lower end of the screw in the recess. The ends of the bar 30 are slidable in vertical slots 31 at the upper portions of metal attaching straps 32 positioned vertically at opposite sides of the casing and which extend inwardly at their lower portions under the bottom of the casing to oppose downward pressure subjected to the top thereof by the clamping screw.

In the operation of the device, oil enters the casing by way of the inlet pipe 17 and is discharged on top of the cartridge 8 and through the perforations of which the oil passes and flows downwardly and out of the lower end of the cartridge under the flange 10 into the sump 23 and from which the filtered oil is returned to the engine.

Figure 3:
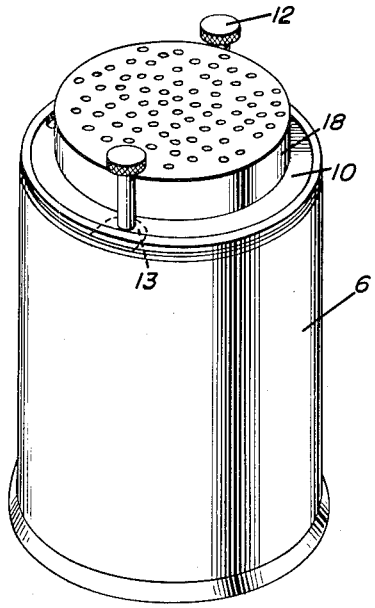
Figure 3 is a perspective view of the upper section of the casing removed and inverted to replace the cartridge.
Figure 4:
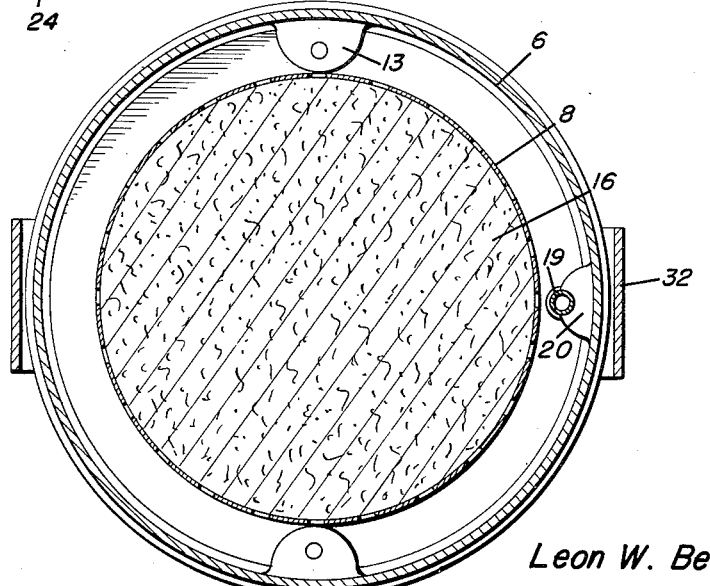
Figure 4 is a transverse sectional view taken on a line 4—4 of Figure 2.
Figure 2:
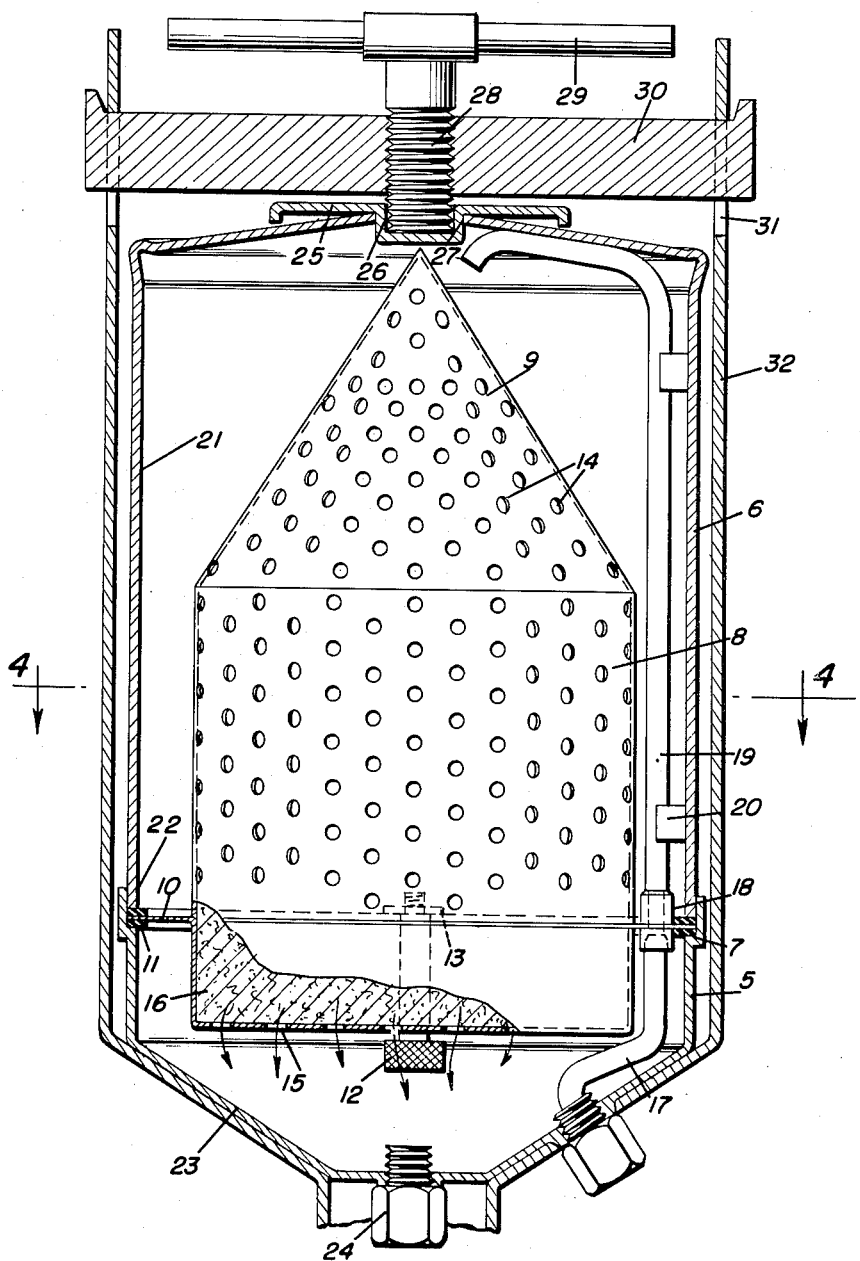
Figure 2 is an enlarged vertical sectional view taken on a line 2—2 of Figure 1.

When replacing the cartridge, the clamping screw 28 is loosened to remove clamping bar 30 and the upper section 6 of the casing, with the cartridge secured therein by the thumb screws 12, is lifted off of the lower section 5 and is then inverted to rest on the disk 25, as shown in Figure 3. The thumb screws 12 are then removed and the cartridge may then be lifted out of the inverted section 2 of the casing and replaced.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows.

1. An oil filter comprising a sectional casing including an upper section and a lower section, supporting means for the casing, a replaceable filtering cartridge having an external annular flange supported between the meeting edges of the upper and lower casing sections to separate the casing into an upper chamber and a lower chamber, means securing the flange in sealing engagement with the lower edge of the upper section of the casing for handling the cartridge and upper section as a unit when separated from the lower section, an oil inlet for the upper chamber and including a lower pipe section entering the lower chamber and an upper pipe section in the upper chamber having a discharge end overlying the top of the cartridge to precipitate oil onto said cartridge, automatic pipe coupling means supported by the flange for the upper and lower pipe sections, an oil outlet for the lower chamber, said cartridge having perforations in its upper and lower portions for the passage of oil therethrough from the upper chamber to the lower chamber, and means clamping the sections of the casing in assembled relation to the supporting means.

2. An oil filter comprising a sectional casing including an upper section and a lower section, supporting means for the casing, a replaceable filtering cartridge having an external annular flange supported between the meeting edges of the upper and lower casing sections to separate the casing into an upper chamber and a lower chamber, an oil inlet pipe connected to the lower section and extending upwardly therein, a nipple extending vertically through the flange and having a telescoping engagement at its lower end with said inlet pipe, a pipe leading upwardly from the nipple in the upper chamber and overlying the top of the cartridge to discharge oil in a precipitating action onto the cartridge, an oil outlet for the lower chamber, said cartridge having perforations in its upper portion at a point above the flange to form a sludge chamber at the bottom of said upper chamber, said cartridge also having perforations in its lower portions for the passage of oil from the upper chamber through the cartridge to the lower chamber, a clamping bar above the casing and engaging the supporting means, and a clamping screw carried by the bar and engaging the top of the casing for securing the sections of the casing in assembled relation to the supporting means.

References Cited in the file of this patent

UNITED STATES PATENTS

| | | |
|---|---|---|
| 1,458,464 | Byers | June 12, 1923 |
| 1,628,510 | Perry | May 10, 1927 |
| 2,202,403 | Sandberg | May 28, 1940 |
| 2,253,685 | Burckhalter | Aug. 26, 1941 |
| 2,626,056 | Macro | Jan. 20, 1953 |